US011374372B2

(12) United States Patent
Schneider et al.

(10) Patent No.: US 11,374,372 B2
(45) Date of Patent: Jun. 28, 2022

(54) DEVICE AND METHOD FOR CRIMPING CONNECTION ELEMENTS, AND CRIMPING CONNECTION

(71) Applicant: TELSONIC HOLDING AG, Bronschhofen (CH)

(72) Inventors: Axel Schneider, Darmstadt (DE); Thomas Hünig, Grosswallstadt (DE)

(73) Assignee: TELSONIC HOLDING AG, Bronschhofen (CH)

( * ) Notice: Subject to any disclaimer, the term of this patent is extended or adjusted under 35 U.S.C. 154(b) by 447 days.

(21) Appl. No.: 16/309,122

(22) PCT Filed: Jun. 12, 2017

(86) PCT No.: PCT/EP2017/064283
§ 371 (c)(1),
(2) Date: Dec. 12, 2018

(87) PCT Pub. No.: WO2017/216104
PCT Pub. Date: Dec. 21, 2017

(65) Prior Publication Data

US 2019/0157825 A1 May 23, 2019

(30) Foreign Application Priority Data

Jun. 14, 2016 (EP) .................................... 16174372

(51) Int. Cl.
*B23P 19/00* (2006.01)
*H02K 15/00* (2006.01)
(Continued)

(52) U.S. Cl.
CPC ......... *H01R 43/0482* (2013.01); *H01R 4/187* (2013.01); *H01R 43/0207* (2013.01); *H01R 43/048* (2013.01); *H01R 43/0488* (2013.01)

(58) Field of Classification Search
CPC ............ H01R 43/0207; H01R 43/0482; H01R 43/0488; H01R 4/187
See application file for complete search history.

(56) References Cited

U.S. PATENT DOCUMENTS 3,594,900 A * 7/1971 Dola .................. H01R 43/0421 29/869
6,161,407 A * 12/2000 Meisser .............. B30B 15/0094 72/20.1
(Continued)

FOREIGN PATENT DOCUMENTS

DE 30 17 364 A1 11/1981
DE 103 36 408 A1 4/2004
(Continued)

OTHER PUBLICATIONS

Chinese Office Action issued in corresponding Chinese Patent Application No. 201780036874.4 dated Nov. 15, 2019.
(Continued)

*Primary Examiner* — Paul D Kim
(74) *Attorney, Agent, or Firm* — Finch & Maloney PLLC; Michael J. Bujold; Jay S. Franklin

(57) ABSTRACT

A device (1) for crimping connection elements (2). The device (1) comprises a machine frame (5), at least one punch, a drive assembly, at least one anvil (17), and a working chamber (31). The punch (3) is preferably arranged in a movable manner in relation to the machine frame (5). The punch (3) contains at least one working surface (4) for deforming a connection element (2). The drive assembly for moving the punch (3) is connected to the punch. The anvil (17) is connected to the machine frame (5) and has a receiving surface (8) for the connection element (2). The working chamber is located between the punch and the anvil and is opened and closed by a relative movement between the punch and the anvil. The device has at least one
(Continued)

Figure 1:
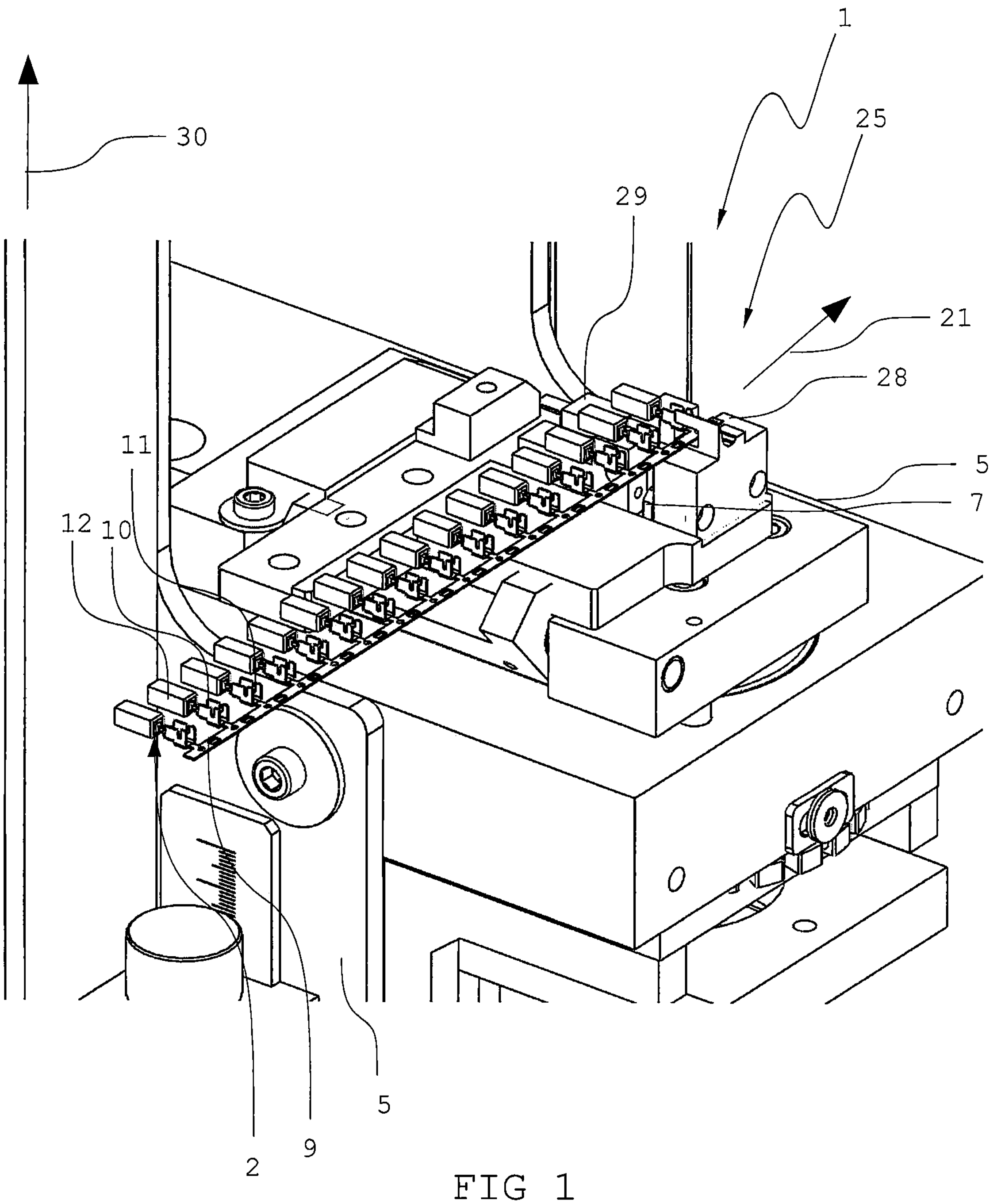

sonotrode, by which the receiving surface (8) of the anvil (17) is supplied with ultrasound.

16 Claims, 6 Drawing Sheets

(51) Int. Cl.

| | |
|---|---|
| ***H01R 43/048*** | (2006.01) |
| ***H01R 4/18*** | (2006.01) |
| ***H01R 43/02*** | (2006.01) |

(56) References Cited

U.S. PATENT DOCUMENTS

| | | | | |
|---|---|---|---|---|
| 7,374,466 | B2 | 5/2008 | Onuma et al. | |
| 8,288,653 | B2 | 10/2012 | Stroh et al. | |
| 8,657,182 | B2 | 2/2014 | Buettiker | |
| 9,248,520 | B2 | 2/2016 | Lang et al. | |
| 9,281,573 | B2 * | 3/2016 | Beck | H01R 4/023 |
| 9,812,835 | B2 | 11/2017 | Kern | |
| 10,090,627 | B2 * | 10/2018 | Stull | H01R 43/048 |
| 10,554,004 | B2 * | 2/2020 | Bohm | B23K 20/106 |
| 2013/0197823 | A1 * | 8/2013 | Williams | G01N 29/38<br>702/39 |
| 2015/0060135 | A1 * | 3/2015 | Handel | B23K 20/10<br>174/74 R |
| 2016/0372881 | A1 | 12/2016 | Bauer et al. | |

FOREIGN PATENT DOCUMENTS

| | | | |
|---|---|---|---|
| DE | 10 2006 021 422 | A1 | 11/2007 |
| DE | 10 2010 029 395 | A1 | 11/2011 |
| DE | 10 2013 010 981 | B3 | 8/2014 |
| DE | 10 2013 219 150 | A1 | 4/2015 |
| EP | 2 219 268 | A1 | 8/2010 |
| EP | 2 457 683 | A1 | 5/2012 |
| JP | 2006-147223 | A | 6/2006 |

OTHER PUBLICATIONS

International Search Corresponding to PCT/EP2017/064283 dated Sep. 15, 2017.

Written Opinion Corresponding to PCT/EP2017/064283 dated Sep. 15, 2017.

* cited by examiner

DEVICE AND METHOD FOR CRIMPING CONNECTION ELEMENTS, AND CRIMPING CONNECTION

The present invention relates to a device and a method for crimping of connection elements, as well as a crimping connection according to the preambles of the independent claims.

Crimping is a joining method in which an insulation-stripped cable is joined to a connection element. Thanks to the connection element, the stripped cable can then be connected to further electrical or electronic components. During crimping, a cable is placed in the connection element and the connection element is usual plastically deformed. Due to the plastic deformation, the connection element is pressed against the cable or the electrical conductors of the cable. The connection element surrounds an insulation-stripped, i.e. bare, conductor portion (core crimp) and the conductor insulation (insulation crimp). The core crimp serves for the electrical connection, the insulation crimp for the tension relief and fixation of the insulation. Thanks to this enclosure, electrical energy can be transferred from the cable to the connection element and beyond.

From DE 10 2013 219 150 A1 there is known a method for producing an electrically conductive connection between an electrical conductor and an electrically conductive component. In the document, a crimp element enclosing the single conductor for a portion is deformed and then joined to a portion of the single conductor. In addition, the document proposes connecting a portion of the single conductor with an ultrasonic welding process using a sonotrode. The document shows a process with two process steps. In the first process step, crimping is done, and in the second process step an ultrasonic welding process is carried out with a second device.

DE 30 17 364 A1 discloses a method and a device for connecting a conductor to a flat plug. In the method, a crimping process and an ultrasound welding process are performed in a single production step. This is done in that an upper embossing die is designed as the sonotrode end of an ultrasound welding unit. In this way, the material is softened and the necessary force application is reduced during the descending of the embossing die (sonotrode). Consequently, the force required for the deformation of the crimp element can be reduced.

Another method for connecting a contact element to a cable is disclosed in DE 103 36 400 B4. In the method, a contact element is uniformly pinched off radially inward by a pair of crimp connection tabs. This connection is then welded by a further tool with ultrasound vibrations. Here as well, separate crimping and ultrasound machines are used.

Therefore, the problem which the invention proposes to solve is to overcome the drawbacks of the prior art. In particular, a device should be provided which is simple in design and which produces durable crimping connections in an easy way.

A further problem of invention is to improve the strength of a crimping connection.

A further problem of the invention is to improve the durability of a crimping connection and to improve the chemical resistance of the crimping connection. Another problem of the invention is to increase the electrical conductivity of a crimping connection.

These problems are solved by the device as defined in the independent patent claims, by the method as defined in the independent patent claims, by the anvil as defined in the independent patent claims and by the crimping connection as defined in the independent patent claims. Further embodiments are disclosed in the dependent claims.

A first aspect of the present invention relates to a device for crimping of connection elements. Typically, the connection elements are crimped with copper or aluminum stranded conductors. The device typically comprises a machine frame, at least one die, a drive assembly, at least one anvil and a working area. The die is preferably arranged in a movable manner in relation to the anvil and especially to the machine frame. The die comprises preferably a recess for deforming the crimping tabs. The die contains at least one working surface for deforming a connection element. The drive assembly for moving the die is connected to the die. The anvil has a receiving surface for the connection element and is preferably connected to the machine frame. The working area is located between die and anvil and can be opened and closed by a relative movement between die and anvil. The device has at least one sonotrode, by means of which the receiving surface of the anvil can be supplied with ultrasound.

By a machine frame is meant here a frame on which machine parts can be fastened. Examples of machine frames are housings, frames, or other fixtures, such as presses, which are suited to supporting parts of the machine.

A die is a part which is suitable for deforming another part. The deformation can occur in that the die exerts pressure on the part to be deformed. The die is held for example in a crimping die receiving device, such as a movable part of a press.

During the crimping, a die moves toward an anvil. The anvil is in a fixed position. The forces on a connection part are typically exerted by the die.

The working surface is preferably situated in the recess. The recess is preferably U-shaped. The recess is preferably broader than the receiving surface. The recess is preferably broader than the connection element. Preferably, ultrasound is not introducible into the die.

A drive assembly for the moving of the die is preferably pneumatic, hydraulic or electrical. The die moves preferably along a linear direction of movement. The drive assembly can be suited to travel a given distance or exert a given force or introduce a given amount of energy. A drive assembly for the moving of the die is, for example, a press, especially an eccentric press.

The anvil is understood as being the mating piece to the die. The connection element is deformed between anvil and die. The anvil is preferably connected to the machine frame.

By sonotrode is meant here an assembly which is preferably designed to vibrate at a frequency of 15-50 kHz. The sonotrode can vibrate torsionally, linearly or longitudinally.

The device according to the invention has the advantage that the sonotrode can be integrated especially easily into a crimping device. Only a few design modifications are needed to integrate the sonotrode in the device. Furthermore, by the introducing of the ultrasound, an oxide layer at the edge of a conductor on which the connection element is being crimped can be broken up. In particular, single conductors of stranded conductors can be joined to each other by the ultrasound. A further benefit is that less force needs to be applied via the die. Another benefit is that a crimping process monitoring is improved.

A further benefit is that crimping and ultrasound welding can be done at the same time with only one device. Crimping connections made with such a device have a particular quality, since they are mechanically durable and electrically conductive.

In preferred embodiments, the device is suited for crimping a plurality of stranded conductors to a connection element. Especially preferred connection elements are double stops, in which two stranded conductors are joined to a connection element. In the double stops, two aluminum stranded conductors (aluminum/aluminum), two copper stranded conductors (copper/copper) or a mixture (copper/aluminum) can be joined to the connection element. The double stops can be configured in a row or one above the other.

Preferably, the device comprises two receiving surfaces, a core crimping area and an insulation crimping area. The areas may be part of a single-piece anvil, having two anvils for each part. The anvils are decoupled from each other with regard to vibration. Each of the anvils has a receiving surface for the crimping. At least one of the receiving surfaces, preferably only one surface, can be subjected to ultrasound.

In this way, crimping can be done on each of the receiving surfaces. For example, a connection element with multiple crimp sections could be deformed. Alternatively, several different elements could foe crimped. Usually, one portion of the connection element is crimped on an insulation of a conductor and another portion of the connection element is crimped on the electrical conductor. Preferably only the electrical conductor is ultrasound-welded to the connection element. Therefore, preferably only the anvils for the electrically conductive crimp are subjected to ultrasound.

Especially preferably, the anvils are decoupled from each other with regard to vibration by a spacing. Alternatively, the anvils may also be decoupled with regard to vibration by dampening materials, such as a foil, which lies between the anvils.

In one alternative embodiment, the device comprises only a single anvil. Especially preferably, the single anvil contains two receiving surfaces.

This is an especially simple embodiment for a machine with which ultrasound welding and crimping can be done in combination.

In one preferred embodiment, the at least one anvil can be releasably connected to the sonotrode. In an especially preferred embodiment, the anvil can be shrink-fitted on the sonotrode. Alternatively, the anvil can be connected by means of a thread or a plug connection to the sonotrode.

Most especially preferred, each sonotrode can be releasably connected to one or more anvils. Alternatively, also only individual sonotrodes can be releasably connected to one or more anvils.

In this way, the anvil is interchangeable. For example, if the receiving surface becomes worn down, only the anvil needs to be replaced and the sonotrode can continue to be used.

In one preferred alternative embodiment, the sonotrode forms the anvil at least partially.

In one alternative embodiment, the sonotrode is in contact with the anvil, yet without being fixed to the anvil. In this embodiment, a replacement of the anvils is especially simple.

In this embodiment, the sonotrode forms the anvil. If the device contains more than one anvil, the sonotrode may form only individual anvils, several anvils, or all anvils.

This enables a simple design with few parts.

In one preferred embodiment, the receiving surface can be subjected to torsional vibrations about an axis perpendicular to the receiving surface. Especially preferably, the receiving surface is curved and can be exposed to vibrations about an axis along a direction of movement of the die.

Torsional ultrasound welding has the advantage that no embrittlement occurs on the connection element. Furthermore, the ultrasound energy can be introduced especially efficiently.

Usually, other devices are found alongside the crimping device, such as devices for processing or further transporting. Torsional ultrasound oscillators can be installed perpendicular to a transport direction of the connection element. Therefore, torsional ultrasound welding can be integrated more easily in terms of space, without the other devices having to be modified. In an alternative embodiment, the receiving surface can be subjected to longitudinal vibrations along an axis parallel to the receiving surface. Preferably, the longitudinal vibrations vibrate along a longitudinal axis of the conductor or perpendicular to the longitudinal axis of the conductor.

Longitudinal vibrations can be used, in particular, if a torsional oscillator cannot be integrated in the device, for example, for reasons of space.

In a further alternative embodiment, the receiving surface can be subjected to longitudinal vibrations parallel to a direction of movement of the die.

In one preferred embodiment, at least the portion of the anvil exposed to vibrations is decoupled from the machine frame with regard to vibration and the anvil cannot move relative to a machine frame during the process. Preferably, the anvil is not movable relative to the machine frame.

One example for a mounting of the anvil decoupled with regard to vibration is a zero-point mounting with flanges.

In this way, only the die needs to be moved during a crimping process. Consequently, the movement is easy to execute, since the ultrasound system including drive and sonotrode does not need to be moved. A further benefit is that the ultrasound vibrations are not transmitted from the anvil to the machine frame.

By not movable is meant here that a vibration is permitted, especially an ultrasound vibration, but no other translatory or rotary movements.

In one preferred embodiment, the working surface is curved such that a contact surface between the die and the anvil is minimized.

When the contact surface is smaller, fewer vibrations are transmitted from the anvil to the die. Consequently, the die can beheld more firmly and is more resistant to the ultrasound vibrations and therefore more durable.

Preferably, the frequency can be adapted to the duration of the closing process. For example, in the case of closing movements which axe brief in time, a high frequency can be used. In this way, a sufficient number of vibrations is still introduced.

Especially preferably, the sonotrode vibrates with a frequency greater than or equal to 20 kHz.

During the crimping process, force is introduced for a short time (e.g. around 200 ms). At high frequencies, ultrasound can be introduced more effectively. In another especially preferred embodiment, the sonotrode vibrates with 30 kHz or with 35 kHz.

The device can also additionally be used for compressing a stranded conductor, especially a copper or aluminum stranded conductor.

A further aspect of the present invention relates to a method for producing a connection between an electrical conductor, preferably a copper or aluminum conductor, and a connection element. First, a connection element is introduced into an opened working area, which is defined by an anvil and a movable die. One end of an electrical conductor is inserted into the connection element. The working area is closed by the movable die. During the closing, at least one working surface of the die and at least one receiving surface of the anvil deform the electrical conductor, especially plastically, so that a non-positive contact is created between the electrical conductor and the connection element. Ultrasound is introduced by means of a sonotrode into the receiving surface of the anvil during and/or after a crimping process. Preferably the working area is formed by a recess in the die and by the anvil.

Such a method has the advantage that the sonotrode need not move during the crimping. A further benefit is that crimping and ultrasound welding can be done at the same time with only a single processing step in a single device.

The introducing of the ultrasound by the anvil enables a more efficient introduction of the ultrasound vibrations, since the anvil is in continuous contact with the connection element across a larger surface during the crimping. In this way, shorter process times can be achieved as compared to separate ultrasound welding and crimping and/or wore energy can be introduced into the connection piece.

A further benefit is that the vibrations can be introduced more directly into single conductors of a cable.

In one preferred method, ultrasound is introduced by means of the sonotrode into the receiving surface even prior to the crimping process.

In one preferred method, the die is not exposed to ultrasound. In this way, the load on the die due to ultrasound is less and the wear on the die is reduced.

In one preferred method, an oxide layer on the electrical conductor is broken up by introducing the ultrasound.

By breaking up the oxide layer, an electrical conduction between connection element and electrical conductor is improved. In particular, aluminum conductors have an external oxide layer which reduces the conductivity. Such a layer is broken up by ultrasound vibrations.

In one preferred method, the movable die comprises a first working surface and the anvil comprises a first receiving surface. Upon closing the working area, a first segment of a connection element is connected to a preferably electrically conducting portion of the electrical conductor by the first receiving surface and the first working surface. The movable die comprises a second working surface and the anvil comprises a second receiving surface. Upon closing of the working area, a second segment of a connection element is connected to the electrical conductor, preferably to an insulation of the conductor, by the second receiving surface and the second working surface.

In this way, a high electrical conductivity can be produced by a first crimp, while a second crimp ensures a stable mechanical connection.

In one preferred method, ultrasound is introduced into the first, preferably only the first, working surface.

In this way, less energy needs to be applied during the ultrasound welding and the energy can be utilized more efficiently.

In one preferred method, ultrasound torsional vibrations are introduced into the connection element.

Preferably, the ultrasound an ultrasound pulse is transmitted into the connection element at least, particularly preferably only, at the instant of maximum force closure of the die.

At maximum force closure, the ultrasound will be transmitted most effectively into the connection element and/or the stranded conductor. It is also conceivable to introduce the ultrasound continuously, i.e., before, during and after the crimping.

The ultrasound may be introduced continuously or in pulses.

A further aspect of the invention relates to a crimping connection produced by a method for producing a connection between an electrical conductor according to one of the claims.

Crimping connections that are made with such a method have a special quality, since they are mechanically durable and electrically conductive. In particular, single conductors of stranded conductors can be joined together by the ultrasound and art oxide layer can be rubbed off at least partly. Furthermore, the individual stranded conductors are cold welded by the applied pressing force and the introduced ultrasound. The introduced vibrations promote the connection process, reduce the required force overall, and at the same time rub off possible oxide layers better than the conventional crimping process.

A further aspect of the present invention relates to an anvil for an ultrasound crimping process. The anvil has a receiving surface for a connection element and an interface. The anvil can be releasably connected to a sonotrode.

In this way, a sonotrode can be connected to an anvil for the crimping and a connection element can be crimped with a tool and subjected to ultrasound. Furthermore, the anvil is interchangeable and can therefore be replaced easily and economically when it becomes worn. Preferably, the anvil is shrink-fitted. Alternatively, the anvil can be connected by means of a thread or a plug connection.

The invention shall be explained more closely below with the aid of figures, which show only exemplary embodiments. There are shown schematically:

FIG. 1: a perspective view of a device for crimping.

Figure 2:
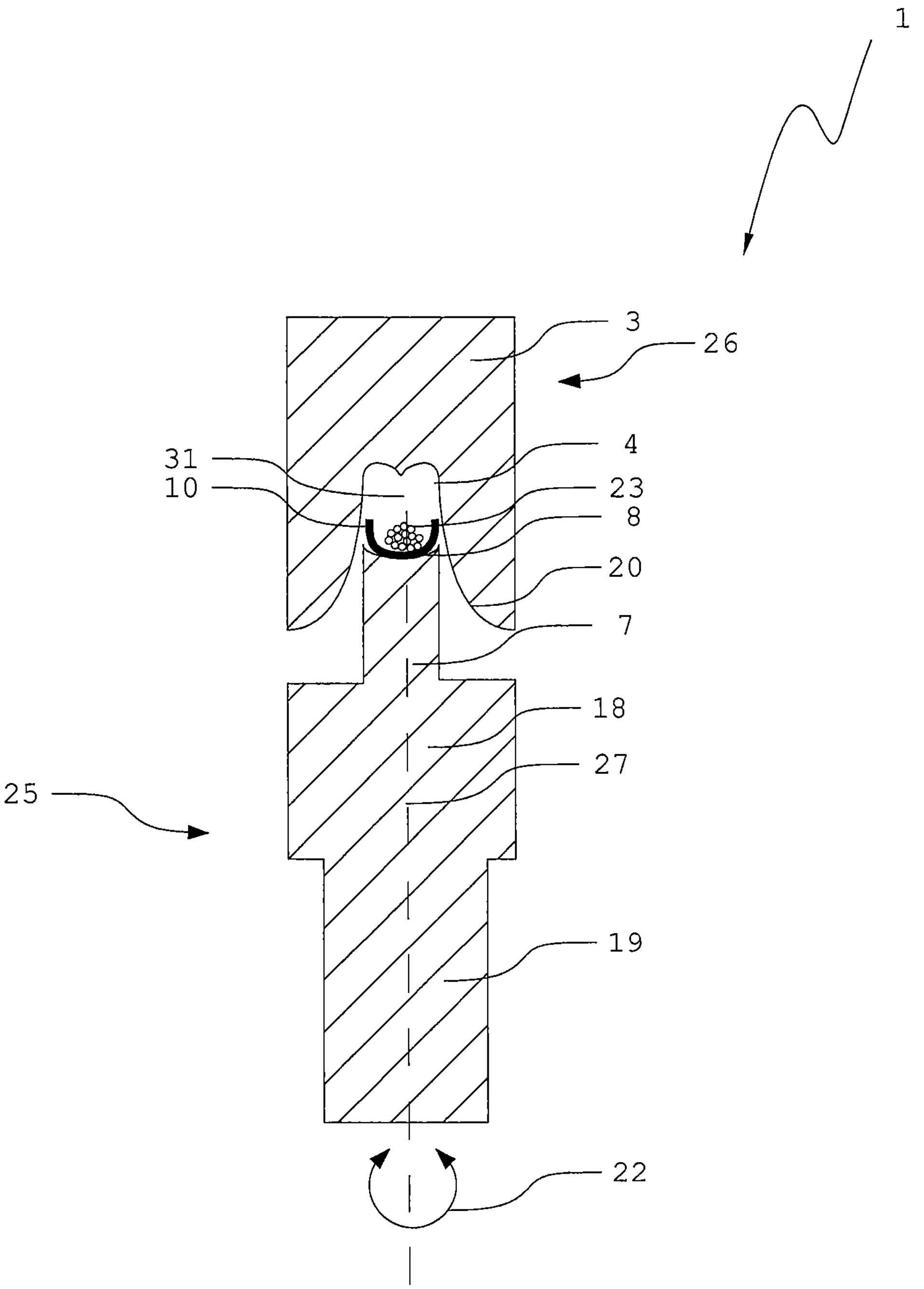

FIG. 2: a cross section of a die and an anvil of a device for crimping.

Figure 3:
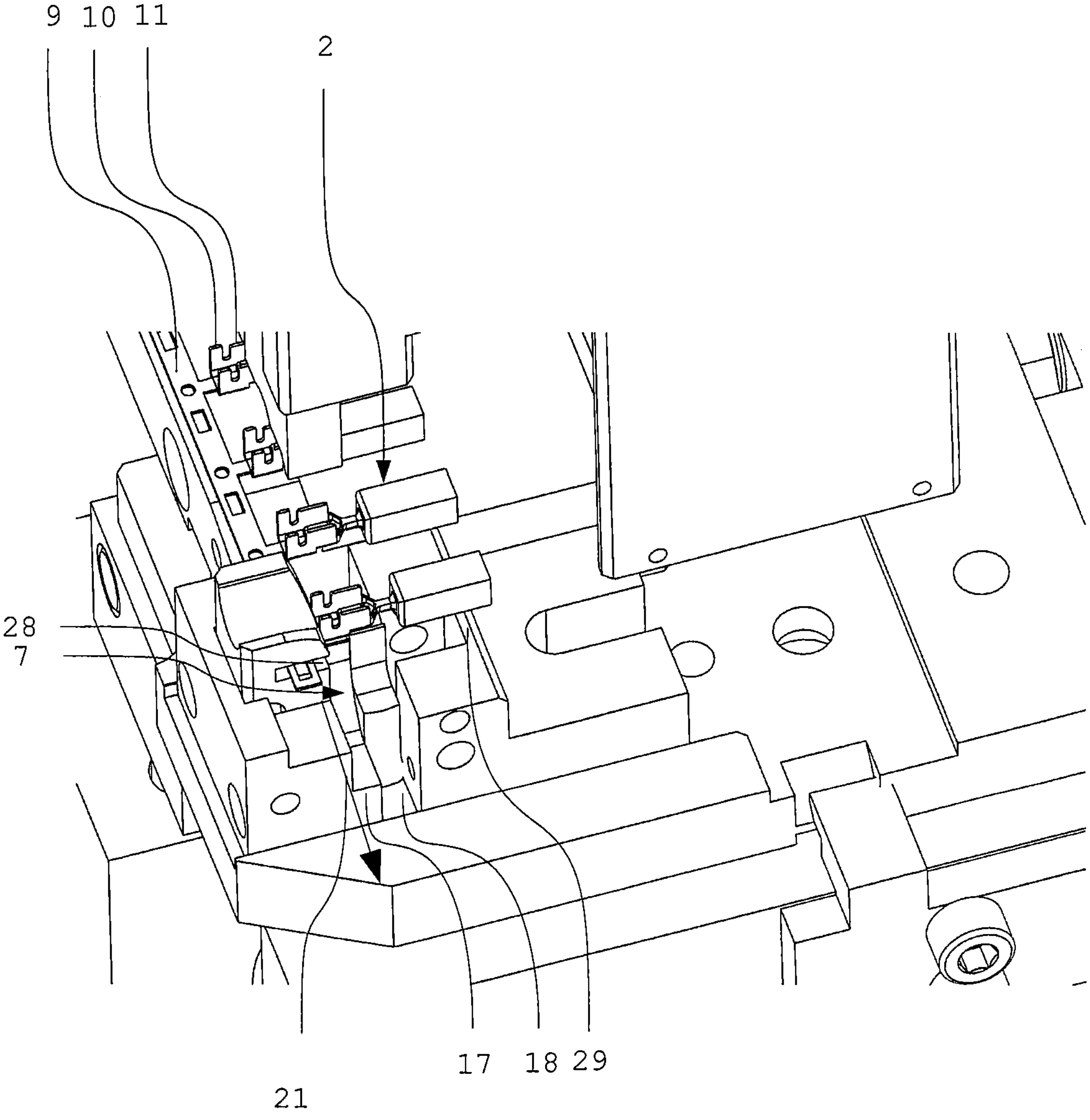

FIG. 3: a perspective detailed view of the device for crimping.

Figure 4:
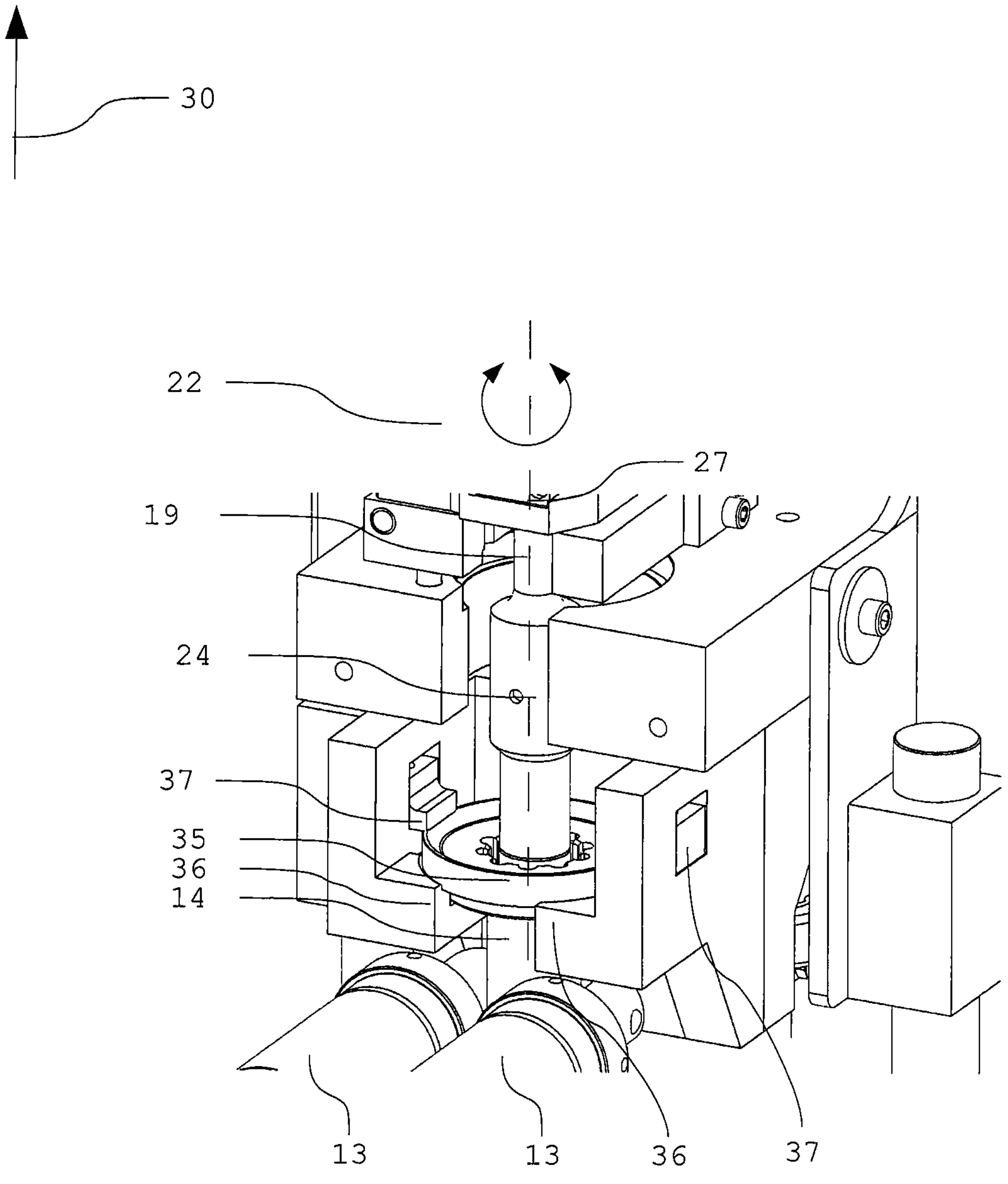

FIG. 4: a perspective view of the device for crimping.

Figure 5:
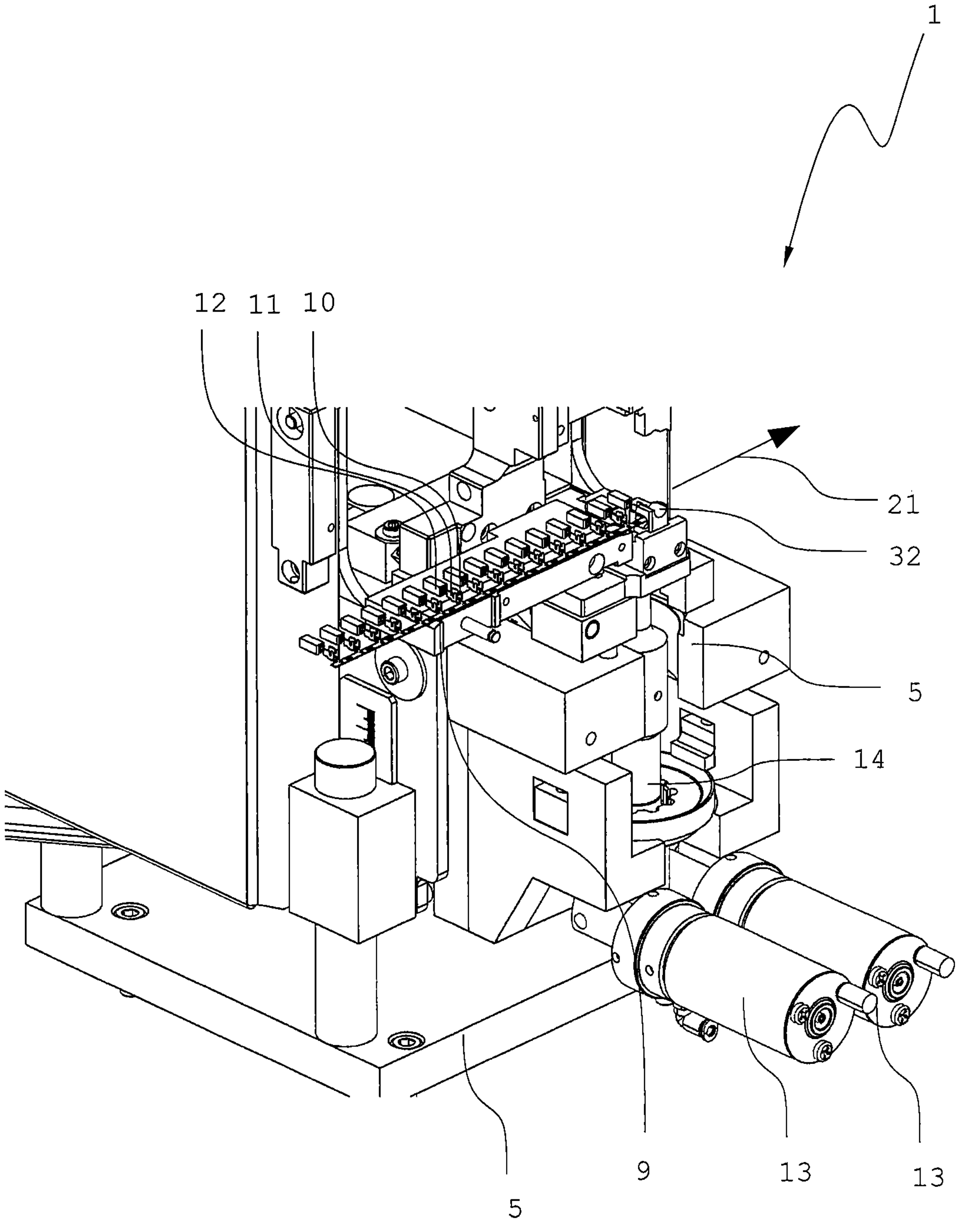

FIG. 5: a perspective view of a lower machine portion of the device for crimping.

Figure 6:
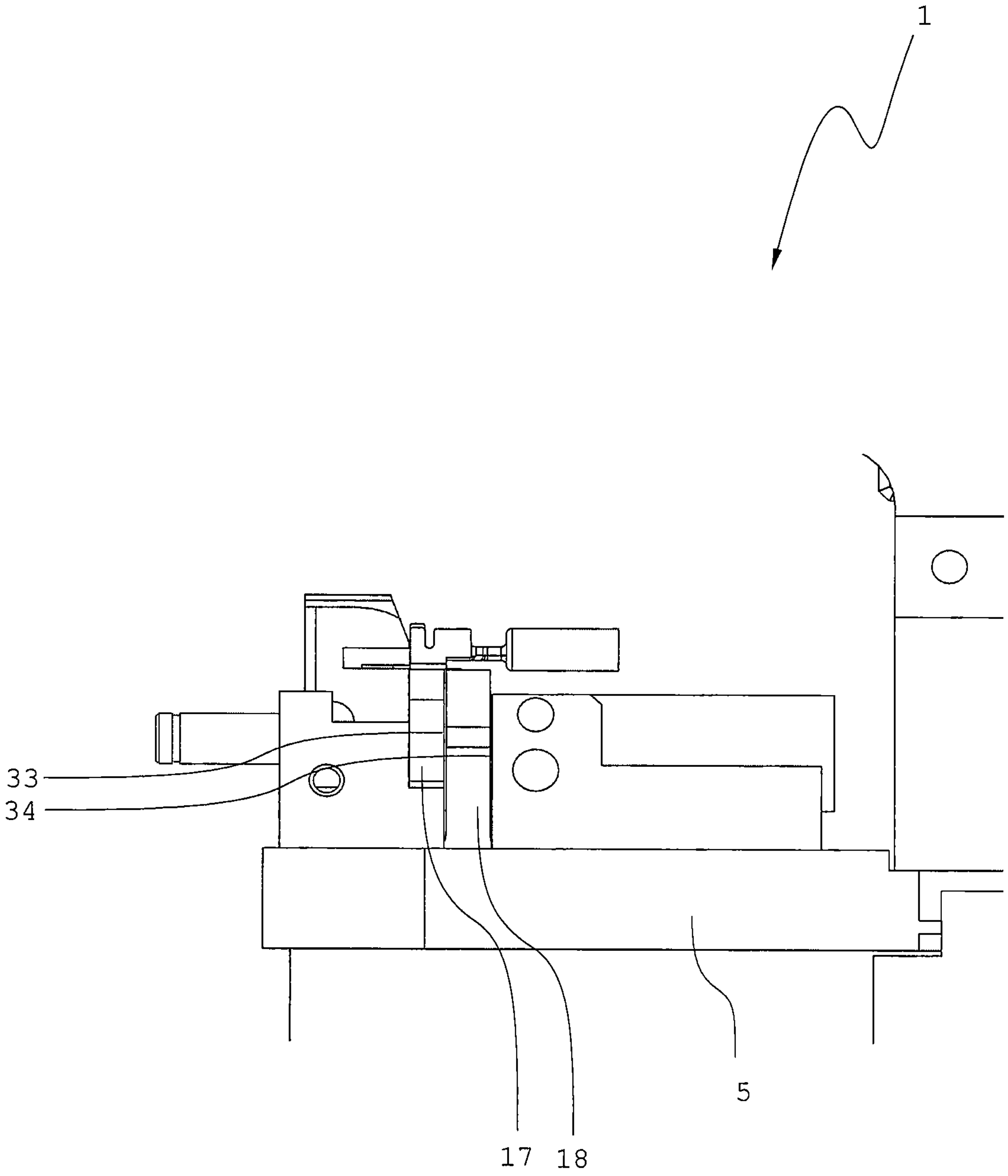

FIG. 6: a side view of the device for crimping.

The perspective view in FIG. 1 shows a device for crimping 1. In FIG. 1, the device 2 is shown in an open position. An upper machine portion 26 (see FIG. 2) has been pushed upward in the direction 30.

FIG. 1 shows the lower machine portion 25 of the device. A plurality of connection elements 2 is conveyed in the lower machine portion 25. The connection elements 2 are each connected to a carrier strip 9 for the connection elements 2. A contact is provided between the connection element 2 and the carrier strip 9. The connection elements 2 themselves contain a first pair of crimping tabs 10 for a crimp around an electrical conductor (not shown) and a second pair of crimping tabs 11 for a tension relief crimp around an insulation of the conductor. Furthermore, each connection element 2 contains a terminal part 12, by which the conductor can then be connected to a terminal. The carrier strip 9 transports the connection elements 2 along a transport direction 21 into the crimping device 1.

The device 1 contains a machine frame 5, by which all the machine portions are connected. The connection elements are crimped at a lower tool 7 and a die 3 (see FIG. 2). The tool 7 and the die 3 are located at a holding surface 23 for the carrier strip 9 of the connection elements 2 and a bearing surface 29 for the terminal part. The tool 7 with two anvils 17, 18 is located between these two surfaces.

When the die 3 (see FIG. 2) moves against the tool 7, the holding surface 28 with the carrier strip 9 is forced downward. The contact between carrier strip 9 and connection element 2 is severed by a spring-loaded blade. In this way, the contact between the carrier strip 9 and the connection element 2 is interrupted. After the crimping process, the die 3 moves away from the tool 7 and the conductor with the connection element is removed from the working area 31. After this, a new connection element 2 is supplied into the working area 31 in that the carrier strip 9 pushes the connection elements 9 in the direction 21.

FIG. 2 shows a cross section of a cutout of the device 1 in a plane formed by the transport direction of the connection elements 21 and a perpendicular direction 30. In FIG. 2, a crimping process at the first pair of crimping tabs 10 is illustrated. Prior to the process, an electrical conductor is stripped of its insulation at one end. This frees up single conductors 23 of a stranded conductor. In the first step of the process, the connection element 2 is placed in a working area 31. The working area 31 is formed by the die 3 and the anvil 7. The connection element 2 is introduced by the carrier strip 9 into the working area 31. The free end of the stranded conductor is introduced by a pit 32 (see FIG. 5) into the connection element 2, so that the free single conductors 23 lie between the first pair of crimping tabs 10 and the insulation of the conductor lies between the second pair of crimping tabs 11 (not shown). The die 3 of the upper machine portion 26 then moves in the direction ox the tool 7. The die 3 is driven with an eccentric press. The die 3 has a working surface 4. The working surface 4 deforms the connection element 2. The working surface 4 shown produces a so-called B-crimp. Furthermore, the working surface 4 has a curvature 20, against which the first pair of crimping tabs 10 slides and is deformed. By the working surface 4, the crimping tabs are at first bent inward and then downward. The deformation of the crimping tabs is plastic. During the deformation, the single conductors 23 are pressed against each other by the crimping tabs 10. The single conductors 22 are pressed against each other such that little or no free gaps are present between the individual single conductors 22. Moreover, the connection element 2 is pressed against a receiving surface 6 of the anvil by the pressure of the die 3.

While the connection element 2 is being plastically deformed by the die 3, at the same time ultrasound is introduced into the connection element 2 and into the single conductors 22 via the receiving surface 8. The tool 7 vibrates about an axis 27 in a direction of vibration 22. The vibration is transmitted from the anvil 18 to the receiving surface 8 and from the receiving surface 8 to the connection element 2 and the single conductors 22. This vibration at ultrasound frequency produces friction between the individual single conductors 22 and between the crimping tabs 10 and the single conductors 22. The friction brings about a welding and breaks up an oxide layer on the outside of the conductor. In this way, the single conductors 23 are welded and an electrical resistance at the junction between single conductors 23 to the connection element 2 is reduced.

FIG. 3 shows a detailed view of the crimping device 1. In FIG. 3, the holding surface 28, the bearing surface 23 and the receiving surface 8 can be seen in detail. The tool 7 contains a first anvil 17 for an insulation crimp and a second anvil 18 for the conductor crimp. The anvil 11 for the insulation or crimp crimps the second pair of crimping tabs 12. The anvil 16 for the conductor crimp crimps the first pair of crimping tabs 10. The die 3 accordingly has two anvils 17, 16, with which the crimping tabs 10, 11 are deformed.

FIG. 4 shows schematically a system for producing torsional ultrasound vibrations. The system contains two ultrasound converters 13. The ultrasound converters 13 are connected to a torsional oscillator 14. The torsional oscillator 14 is a cylindrical body to whose shell surface the converters 13 are connected on opposite sides. The converters 23 vibrate in push-pull fashion. In this way, a torsional movement is generated about the axis 27 of the converter itself.

The torsional oscillator 14 is held by a zero-point mounting with a flange 35. The flange 35 is shrink-fitted on the torsional oscillator at an oscillatory node of the torsional oscillator 14. The flange 35 holds the torsional oscillator 14 by resting against beams 36. At the same time, the flange 35 is pressed from above against the beams 36 by clamping devices 37.

The torsional oscillator is connected to a transformation piece 24, configured according to the desired amplitude of vibration. The transformation piece 24 is adjoined by a sonotrode 19, forming the anvil 28 for the crimping.

FIG. 5 shows a further schematic view of the crimping device 1. In FIG. 5, one conceivable height adjustment for the anvil 18 is shown. By activating, that is, by turning the wheel 15, the anvil 17 is displaced in the direction of the axis 27.

FIG. 6 shows a side view of the crimping device 1. In the device 1, the anvils 17, 18 are separated by a gap 33 and do not touch. The gap is broader than the amplitude of vibration with which the anvil 18 vibrates. The anvil 28 is likewise decoupled in vibration from the machine frame 5 by a second gap 34. In addition, the anvil is connected by the zero-point mounting with flanges to the machine frame (see FIG. 4).

The invention claimed is:

1. A device for crimping of connection elements with electrical conductors, wherein the device comprises:

at least one die, having a recess for deforming crimping tabs, with at least one working surface for deforming a connection element, a drive assembly for moving the at least one die, at least two anvils, wherein each of the at least two anvils has a receiving surface for the connection element, a working area between the at least one die and the at least two anvils is openable and closeable by a relative movement between the at least one die and the at least two anvils, wherein the device has at least one sonotrode, by which ultrasound is introducible into the receiving surface of only a first one of the at least two anvils such that an electrical conductor is ultrasonically welded to the connection element, the at least two anvils are decoupled from each other with regard to vibration.

2. The device according to claim 1, wherein the first anvil of the at least two anvils is releasably connectable to the at least one sonotrode.

3. The device according to claim 1, wherein the at least one sonotrode forms at least part of the first anvil.

4. The device according to claim 1, wherein torsional vibrations about an axis perpendicular to the receiving surface of at least the first anvil or longitudinal vibrations along an axis parallel or transverse to the receiving surface of at least the first anvil are introducible into the receiving surface of the first anvil, and the at least one sonotrode vibrates with a frequency greater than or equal to 20 kHz.

5. The device according to claim 1, wherein the device further comprises a machine frame and wherein at least a portion of the first anvil is decoupled from the machine frame with regard to vibration and the first anvil is not moveable relative to the machine frame during a crimping process.

6. The device according to claim 1, wherein the working surface is curved such that a contact surface between the at least one die and the at least two anvils is minimized.

7. A use of a device according to claim 1, for compressing a stranded conductor.

8. A method for producing a connection between an electrical conductor and a connection element involving the following steps:

introducing the connection element into an opened working area, which is defined by at least two anvils and a movable die, wherein the at least two anvils are decoupled from each other with regard to vibration and wherein each of the at least two anvils has a respective receiving surface;

inserting one end of an electrical conductor into the connection element;

closing the working area with the movable die, wherein during the closing, at least one working surface of the die and at least one of the at least two receiving surfaces of the anvils deform the connection element so that a force-locking contact is created between the electrical conductor and the connection element; and introducing ultrasound by a sonotrode into only one of the at least two receiving surfaces of the anvil during and/or said deforming of the connection element such that the electrical conductor is ultrasonically welded to the connection element.

9. The method according to claim 8, wherein, upon closing the working area, a first segment of the connection element is connected to a portion of the electrical conductor by a first receiving surface of the anvil and a first one of the at least working surfaces of the die, and upon closing of the working area a second segment of the connection element is connected to the electrical conductor by a second one of the receiving surfaces of the anvil or a receiving surface of a second anvil and a second working surface of the die or a working surface of a second die.

10. The method according to claim 9, wherein the ultrasound is introduced only into the first receiving surface.

11. The method according to claim 8, further comprising introducing torsional ultrasound vibrations into the connection element.

12. The method according to claim 8, further comprising transmitting an ultrasound pulse into the connection element at least upon maximum force application between the die and the connection element.

13. The device according to claim 1, wherein the at least two anvils are decoupled from each other with regard to vibration by a spacing.

14. The method according to claim 8, wherein the at least two anvils are decoupled from each other with regard to vibration by a spacing.

15. The method according to claim 8, wherein the anvils are decoupled with regard to vibration by a dampening material which is arranged between the anvils.

16. The method as according to claim 15, wherein the dampening material is a foil.

* * * * *